(12) United States Patent
Chen

(10) Patent No.: US 9,630,280 B2
(45) Date of Patent: Apr. 25, 2017

(54) METHOD FOR PRODUCING SINGLE-SIDED MOLD AND DOUBLE-SIDED COINING MOLD THEREOF

(71) Applicant: Duraflex Hong Kong Limited, Hong Kong (HK)

(72) Inventor: Te Chien Chen, Hong Kong (HK)

(73) Assignee: DURAFLEX HONG KONG LIMITED, Hong Kong (HK)

( * ) Notice: Subject to any disclaimer, the term of this patent is extended or adjusted under 35 U.S.C. 154(b) by 275 days.

(21) Appl. No.: 14/592,886

(22) Filed: Jan. 8, 2015

(65) Prior Publication Data

US 2015/0197040 A1 Jul. 16, 2015

(30) Foreign Application Priority Data

Jan. 14, 2014 (CN) .......................... 2014 1 0016541

(51) Int. Cl.
*B23P 15/24* (2006.01)
*B29L 5/00* (2006.01)
*B29C 33/42* (2006.01)

(52) U.S. Cl.
CPC .............. *B23P 15/24* (2013.01); *B29C 33/42* (2013.01); *B29L 2005/00* (2013.01); *Y10T 29/49996* (2015.01)

(58) Field of Classification Search
CPC . B23P 15/24; B23P 11/005; B23P 9/02; B23P 23/02; B23P 2700/00; B23P 17/00; Y10T 29/49996; B29C 33/42; B29C 33/3842; B29C 33/38; B29L 2005/00; B26D 11/00; B26D 3/06; B26D 3/065; B23B 35/00; B23B 43/00; B23B 2200/00; B23B 2200/04; B23B 2200/049; B23B 2200/0485; B23B 2270/12; B23B 2270/14; B23B 2270/16; B23B 2270/54; B23B 2270/56; B21D 22/00; B21D 26/00
USPC .................................... 264/219–227; 72/359
See application file for complete search history.

(56) References Cited

U.S. PATENT DOCUMENTS 3,001,423 A * 9/1961 Elliott ..................... B23B 35/00
408/199
3,863,525 A * 2/1975 Cale ........................ B21J 13/02
409/131

* cited by examiner

*Primary Examiner* — Matthew Daniels
*Assistant Examiner* — Leith S Shafi

(57) ABSTRACT

A method for producing a single-sided mold and a double-sided coining mold are provided. The method comprises the following steps: S1. forming a mold cavity on the single-sided mold according to shape of a product; S2. engraving a surface of the mold cavity by a first engraving and milling cutter to form engraved holes, and then inserting a second engraving and milling cutter into the engraved holes for further engraving to form holes to be coined; S3. repeating the step S2 until a predefined number of the holes to be coined are formed on the surface of the mold cavity; S4. placing a coining die with hardened tips on the surface of the mold cavity, and embedding each of the hardened tips into one of the holes to be coined respectively, and then the mold cavity being molded by a coining process.

8 Claims, 3 Drawing Sheets

METHOD FOR PRODUCING SINGLE-SIDED MOLD AND DOUBLE-SIDED COINING MOLD THEREOF

CROSS REFERENCE TO RELATED PATENT APPLICATIONS

The present patent application claims benefit of Chinese patent application No. 201410016541.3 filed on Jan. 14, 2014, the entire contents are incorporated by reference.

TECHNICAL FIELD

The present application generally relates to mold manufacturing technology, more particularly to a method for producing a single-sided mold and a double-sided coining mold.

BACKGROUND

In order to facilitate plastic products (e.g. a plastic zipper puller) having better handle, a plurality of pointy projections are arranged on surfaces of the zipper puller. Therefore, a plurality of corresponding coining holes are needed to be formed in a mold cavity of the zipper puller. A prior manufacturing method includes firstly engraving holes to be coined in the mold cavity according to the pointy projections of the zipper puller, then molding the mold cavity by a coining die with hardened tips.

However in the prior method, shape of the holes to be coined which are formed by engraving and milling is greatly different from shape of the pointy projections, thus the coining area is large, and material being coined is excessively extruded. It is easy to cause material around the holes being protuberant. Thereupon, post processing for flattening is required after the coining process is finished. If a coining depth is larger, it will result in damage to side walls of the coining holes in the mold cavity.

At the same time, since both of the area and the depth of the coining process are large, not only the cracking of the coining holes during the coining process is easy to occur, but also it is difficult to make an optimal cusp on the end of the coining holes because the radius of the cusps is normally larger than 0.05 mm.

SUMMARY

For the drawbacks of material around the holes being protuberant due to a excessive extrusion and the bigger-sized cusp on the end of the coining hole in the prior art, the present application provides a solution by producing a single-sided mold and a double-sided coining mold.

In one aspect, a method for producing a single-sided mold is provided, comprising the following steps:

S1. forming a mold cavity on the single-sided mold according to shape of a product;

S2. engraving a surface of the mold cavity by a first engraving and milling cutter mounted on an engraving and milling machine, wherein under control of the engraving and milling machine, the first engraving and milling cutter revolves on its own axis and then exerts a vertical force onto the surface of the mold cavity, and then exits out of an engraved hole after the engraved hole is formed; and inserting a second engraving and milling cutter mounted on the engraving and milling machine into the engraved hole for further engraving, wherein under control of the engraving and milling machine, the second engraving and milling cutter revolves on its own axis and then exerts a vertical force in the engraved hole, and then exits out of a hole to be coined after the hole to be coined is formed; and wherein the first engraving and milling cutter is shaped as a pointed cutter with flat bottom or a straight cutter, while the second engraving and milling cutter is shaped as a pointed cutter with flat bottom with a smaller width and angle of knife tip than that of the first engraving and milling cutter; and depth of the engraved hole is smaller than that of the hole to be coined;

S3. repeating the step S2 until a predefined number of the holes to be coined are formed on the surface of the mold cavity;

S4. placing a coining die with hardened tips on the surface of the mold cavity, and embedding each of the hardened tips into one of the holes to be coined respectively, then pressing the mold cavity by a hydraulic press, causing each of the holes to be coined being pressed to form the coining hole, and then taking out the coining die after a coining process is finished;

wherein a side wall of the hole to be coined matches shape of the hardened tip, and radius of a cusp on the end of the coining hole formed by the coining process is less than 0.02 mm.

In one embodiment, in the step S2, the second engraving and milling cutter inclines to one side after exerting a vertical force in the engraved hole for a predefined time, and then revolves using an inserting path of the second engraving and milling cutter as a central axis until the side wall of the hole to be coined matches the shape of the hardened tip, and then the second engraving and milling cutter is controlled to return to a vertical state and exit out of the hole to be coined, and an inclination angle of the second engraving and milling cutter relative to a vertical direction is from 5° to 45°.

In this embodiment, the radius of the cusp on the end of the hole to be coined ranges from 0.04 mm to 0.05 mm, and a depth of the hole to be coined is 0.05~0.2 mm less than the coining hole.

In this embodiment, in the step S3, the first engraving and milling cutter moves to a next engraving position for engraving while the second engraving and milling cutter inserts into the engraved hole for further engraving.

In this embodiment, the predefined number of holes to be coined formed in the step S3 is distributed in an array.

In this embodiment, depth of the engraved hole is half of the depth of the hole to be coined.

In this embodiment, a revolution of the first engraving and milling cutter ranges from 18000 r/min to 24000 r/min, and a revolution of the second engraving and milling cutter ranges from 24000 r/min to 30000 r/min, and amount of feeds of both the first engraving and milling cutter and the second engraving and milling cutter range from 1.3 m/min to 1.7 m/min.

In this embodiment, pressure of the hydraulic press is 80 MPa.

In another aspect, a double-sided coining mold is provided, comprising an upper die and a lower die produced by the method for producing a single-sided mold according to above text respectively. The upper die and the lower die are designed to be opposite to each other. When the upper die is closed with the lower die, each mold cavity in the upper die is corresponding to each mold cavity in the lower die.

The method for producing a single-sided mold and the double-sided coining mold according to embodiments of the present application have the following advantages: another engraving and milling cutter is used to perform a further engraving after the preliminary engraving is finished, thus the depth and side area of the engraved holes are increased, ensuring that the holes to be coined which are formed by engraving primarily meet the requirements of a mold. When performing the coining process by a coining die, only the side walls of the holes to be coined are needed to be flattened, and the cusps with smaller radius are needed to be pressed out at bottom of the holes to be coined. During the coining process, the coining die evenly exerts force on the holes to be coined, thus the side walls of the coining holes can be smoother, and the radius of the cusps of the coining holes can be smaller. Moreover, the molds can be produced as a batch, so as to reduce working hours and costs.

BRIEF DESCRIPTION OF THE DRAWINGS

The present application will be further described with reference to the accompanying drawings and embodiments in the following, and in the accompanying drawings.

DETAILED DESCRIPTION OF THE PREFERRED EMBODIMENT

Since the prior method just performs a preliminary engraving to the mold cavity, both of the area and the depth of the coining process are large, and it is easy to cause material around the holes being protuberant due to excessive extrusion to the material being coined. Furthermore, the radius of cusps on the end of the coining holes formed by the prior method is larger than 0.05 mm, thus the optimal effect of the zipper puller is not met.

In the present application, another engraving and milling cutter is used to perform a further engraving after the preliminary engraving is finished, thus the depth and side area of the engraved holes are increased, ensuring that the holes to be coined which are formed by engraving primarily meet requirements of a mold. When performing the coining process by a coining die, only the side walls of the holes to be coined are needed to be flattened, and the cusps with smaller radius are needed to be pressed out at bottom of the holes to be coined. During the coining process, the coining die evenly exerts force on the holes to be coined, thus the side walls of the coining holes can be smoother, and the radius of the cusps of the coining holes can be smaller.

Figure 1:
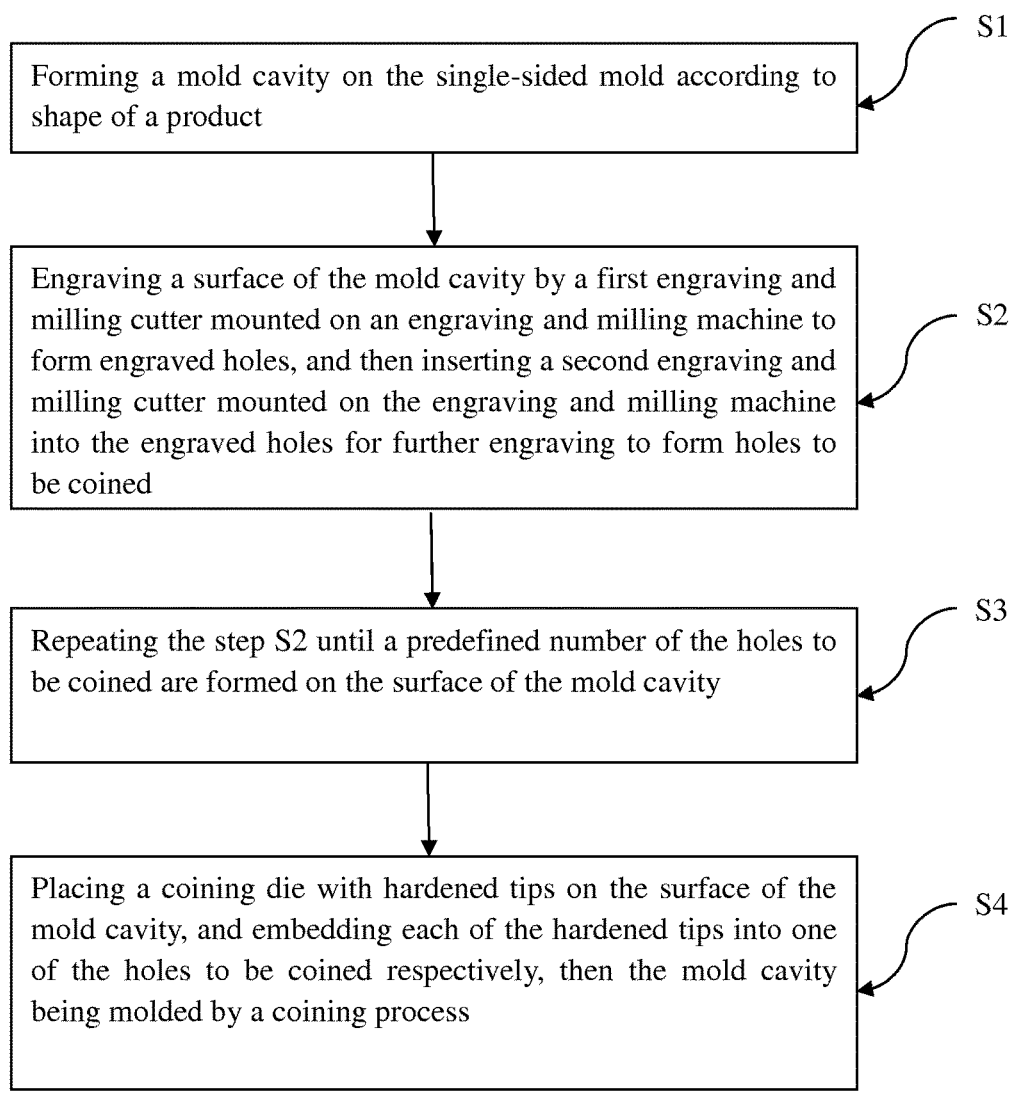
FIG. 1 is a flowchart illustrating a method for producing a single-sided mold according to a preferred embodiment of the present application.

FIG. 1 illustrates a method for producing a single-sided mold according to a preferred embodiment of the present application. As shown in FIG. 1, the method comprises the following steps.

S1. A mold cavity is formed on the single-sided mold according to shape of a product.

S2. A surface of the mold cavity is engraved by a first engraving and milling cutter mounted on an engraving and milling machine. Under control of the engraving and milling machine, the first engraving and milling cutter revolves on its own axis and then exerts a vertical force onto the surface of the mold cavity. After an engraved hole is formed, the engraving and milling machine controls the first engraving and milling cutter exiting out of the engraved hole.

Then a second engraving and milling cutter mounted on the engraving and milling machine is inserted into the engraved hole for a further engraving. Under control of the engraving and milling machine, the second engraving and milling cutter revolves on its own axis and then exerts a vertical force in the engraved hole. After a hole to be coined is formed, the engraving and milling machine controls the second engraving and milling cutter exiting out of the hole to be coined.

The first engraving and milling cutter is a pointed cutter with flat bottom or a straight cutter, and the second engraving and milling cutter is a pointed cutter with flat bottom. The width and the angle of the knife tip of the second engraving and milling cutter are smaller than that of the first engraving and milling cutter. Depth of the engraved hole is smaller than that of the hole to be coined.

S3. The step S2 is repeated until a predefined number of the holes to be coined are formed on the surface of the mold cavity.

S4. A coining die with hardened tips is placed on the surface of the mold cavity, and each of the hardened tips is embedded into one of the holes to be coined respectively. Then the mold cavity is pressed by a hydraulic press, and each of the holes to be coined is pressed to form the coining hole. The coining die is taken out after the coining process is finished.

Wherein, a side wall of the hole to be coined matches shape of the hardened tip, and radius of a cusp on the end of the coining hole formed by the coining process is less than 0.02 mm.

In the present application, the term "single-sided mold" refers to a mold used for one side molding of a plastic product. At least one mold cavity is configured on each of the single-sided molds. While two single-sided molds are cooperated together, shape of a plastic zipper puller can be formed by joining two mold cavities which are arranged opposite to each other.

It is needed to explain that the CNC engraving and milling machine is one kind of numerically-controlled machines. It is generally recognized that the engraving and milling machine is a numerically-controlled milling machine using small cutters and a spindle motor with high power and high speed. While the engraving and milling cutter mounted on the engraving and milling machine is performing engraving operation, the engraving and milling cutter revolves on its own axis at a high speed driven by a spindle, thus to form a force for engraving the surface of the mold cavity.

In the present application, firstly the surface of the mold cavity is preliminarily engraved by the first engraving and milling cutter to form the engraved hole. After the engraved hole is formed, the engraved hole is further engraved by the second engraving and milling cutter, so as to make the further engraved hole substantively match the shape of the finally molded coining hole. Furthermore, the force exerted on the mold cavity becomes more even, and the smooth degree of the side wall and the cusp on the end of the final molded coining hole meet the requirements better.

Wherein, the depth of the engraved hole is preferably half of the depth of the hole to be coined. The depth of the holes can be realized by controlling height and inserting distance of the engraving and milling cutters.

Figure 2:
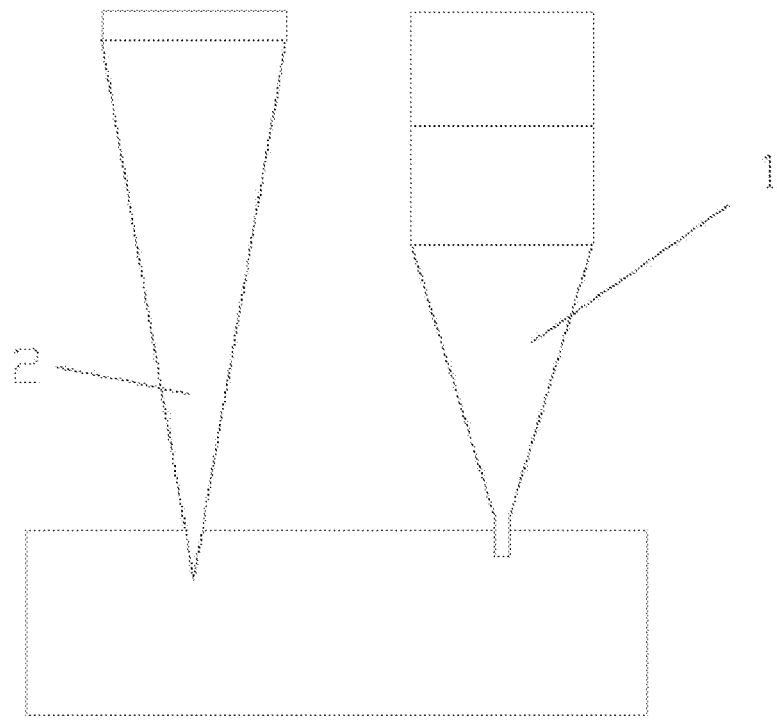
FIG. 2 is a schematic diagram illustrating engraving a mold cavity by a first engraving and milling cutter and a second engraving and milling cutter respectively according to the present application.

FIG. 2 is a schematic diagram illustrating engraving the mold cavity by the first engraving and milling cutter 1 and the second engraving and milling cutter 2 respectively according to the present application, wherein the left one is the second engraving and milling cutter 2 and the right one is the first engraving and milling cutter 1. When selecting the engraving and milling cutters in the present application, the first engraving and milling cutter 1 is only used for forming holes on the surface of the mold cavity, and there isn't any requirements for the shape of the holes. However, the second engraving and milling cutter 2 finish machines the holes to make the holes substantively meet the requirements of the mold. Therefore, the end of the second engraving and milling cutter 2 is usually smaller than the end of the first engraving and milling cutter 1.

The first engraving and milling cutter 1 is a pointed cutter with flat bottom or a straight cutter. The straight cutter is also called column cutter, that is to say, the end of the cutter is obtuse. Accordingly, the second engraving and milling cutter 2 is a pointed cutter with flat bottom.

For the pointed cutter with flat bottom, the width and the angle of the knife tip are usually used for measuring properties of the engraving and milling cutter. The width of the knife tip, represented by W2 in practice applications, will directly influence engraving effect, thus it needs to be set accurately. In the present application, the engraving and milling cutters, especially the second engraving and milling cutter 2, should be selected accurately according to the engraving angle. The angle of the knife tip, represented by A in practice applications, generally refers to half of an angle between two edges of the knife tip. For example, if the angle between two edges of the knife tip is 30°, then A of the cutter should be 15°, and so on. In the present application, if the first engraving and milling cutter is a pointed cutter with flat bottom, the width of knife tip and the angle of knife tip of the second engraving and milling cutter should be smaller than the first engraving and milling cutter.

Furthermore, in order to ensure the shape of the holes to be coined being able to match the hardened tips of the coining die, a solution is provided. In this solution, after the second engraving and milling cutter 2 exerts a vertical force in the engraved hole for a predefined time (for example 3-20 s), the second engraving and milling cutter 2 is controlled to incline to one side using a contact point between the second engraving and milling cutter 2 and the mold cavity as a fulcrum, and then the second engraving and milling cutter 2 revolves using an inserting path of the second engraving and milling cutter 2 as a central axis until a satisfied hole to be coined (i.e., the side wall of the hole to be coined matches the shape of the hardened tip) is formed. Then the second engraving and milling cutter 2 is controlled to return to a vertical state and exit out of the hole to be coined. An inclination angle of the second engraving and milling cutter 2 relative to the vertical direction can be adjusted according to the angle of knife edge of the second engraving and milling cutter and a dip angle of the side wall of the hole to be coined. Preferably the inclination angle ranges from 5° to 45°. Moreover, the shape of the end of the second engraving and milling cutter 2 may be as same as the shape of the coining hole. Therefore, a satisfied hole to be coined can be formed in the step S2 by controlling the second engraving and milling cutter 2 rotate in a general manner.

Wherein, a revolution of the first engraving and milling cutter 1 ranges from 18000 r/min to 24000 r/min, and a revolution of the second engraving and milling cutter 2 ranges from 24000 r/min to 30000 r/min. An amount of feed refers to an amount of displacement of a cutter relative to a work piece in a feeding direction. In this embodiment, the amount of feeds of both the first engraving and milling cutter 1 and the second engraving and milling cutter 2 range from 1.3 m/min to 1.7 m/min. Pressure of the hydraulic press is 80 MPa.

Figure 3A:
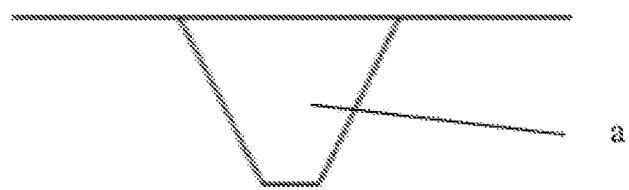
FIG. 3a and FIG. 3b are sectional schematic diagrams of a hole to be coined and a coining hole respectively.
Figure 3B:
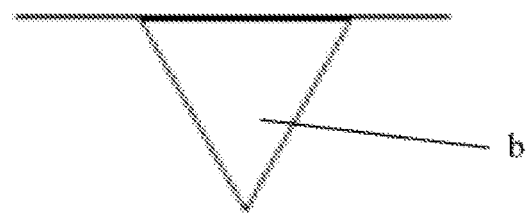

Referring to FIG. 3a and FIG. 3b, the depth of the hole to be coined is generally 0.05~0.2 mm less, compared with the depth of the coining hole b. This depth difference is a reserved depth for being finally molded by a coining die. Correspondingly, the radius of the cusp on the end of the hole to be coined ranges from 0.04 mm to 0.05 mm.

In order to speed up the engraving progress and improve work efficiency, the first engraving and milling cutter 1 and the second engraving and milling cutter 2 can work simultaneously. In the step S3, operation of engraving the holes to be coined is repeated, therefore while the first engraving and milling cutter 1 finished engraving a previous engraved hole, it is immediately pulled out of the engraved hole and translates to a next engraving position for engraving a next engraved hole. At the same time, the second engraving and milling cutter 2 is inserted into the processed engraved hole for further engraving. And while the first engraving and milling cutter 1 finished engraving the next engraved hole, the second engraving and milling cutter 2 will move to the next engraved hole for further engraving.

In addition, if the engraving and milling machine can only control one engraving and milling cutter at a time, in order to improve work efficiency, the first engraving and milling cutter 1 can be used to finish engraving of all the engraved holes, and then the second engraving and milling cutter 2 is used instead of the first engraving and milling cutter 1 to further engrave the finished engraved holes one by one.

Furthermore, number and arrangement of the holes to be coined formed in the step S3 are set according to requirements of the practical zipper puller. For example, the holes to be coined may be distributed as an array or a particular image or a LOGO and so on. An engraving path of the engraving and milling cutters is pre-set by a control device (for example a PLC). During the engraving process, users only need to start the engraving and milling machine and to make the engraving and milling cutters perform automatic engraving operation according to a pre-set program.

The present application also discloses a double-sided coining mold, which relative to the single-sided mold, refers to a mold for double-sided molding the zipper puller. Generally, the double-sided coining mold may be composed of two single-sided molds.

In a preferred embodiment of the present application, the double-sided coining mold comprises an upper die and a lower die opposite to each other. The upper die and the lower die are produced by the method for producing the single-sided mold provided in the above-mentioned embodiments.

Figure 4:
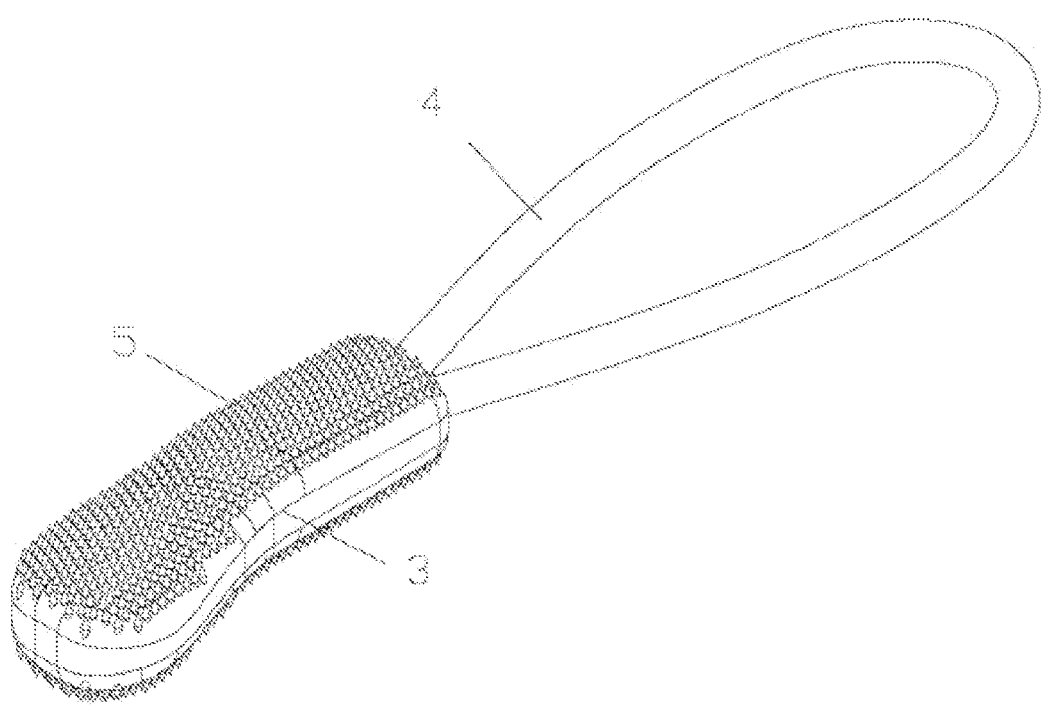
FIG. 4 is a schematic diagram illustrating a final molded product of a double-sided coining mold.

Thereupon, mold cavities are formed in the upper die and the lower die respectively. A predefined number of coining holes are formed in each mold cavity. When the upper die is closed with the lower die, each mold cavity in the upper die is corresponding to one mold cavity in the lower die. A cavity is formed by combining the mold cavities in the upper die and the mold cavities in the lower die, and shape of the cavity is same as the shape of the product. As shown in FIG. 4, the zipper puller comprises a main body 3 and a cord fastener 4, wherein the main body 3 is coining molded by the above double-sided mold. Pointy projections 5 are distributed throughout two sides of the main body 3.

Generally, a plurality of zipper pullers are combined together to form one page for unified wholesale and sale. Thus during the injection molding process, a plurality of zipper pullers can be combined together by a plastic connector. Correspondingly, a connector cavity used for forming the connector is formed on the surfaces of the dies. The connector cavity is connected to each mold cavity respectively, but depth of the connection region is much less than depth of the other cavity regions, so as to facilitate taking the zipper pullers out conveniently.

In conclusion, in the present application, the second engraving and milling cutter is used to perform further engraving after the first engraving and milling cutter performs a preliminary engraving, thus to increase the depth and the side area of the engraved hole, and the hole to be coined roughly meets the requirements of the mold. While the coining die is used to perform the coining process, it only needs to flatten the side wall of the hole to be coined, and to form the cusp with smaller radius on the bottom of the hole to be coined.

During the coining process, the coining die evenly exerts force on the holes to be coined, and the hardened tips are tightly combined with the holes to be coined. Correspondingly, surface hardness will be increased, and the side wall of the coining holes will become smoother, and the radius of the cusps of the coining holes will become smaller.

It should be understood that, one skilled in the art can make any improvements or modifications which don't depart from the scope of the spirit and the principle of the present application, and these improvements and modifications should be included within the scope of the present application.

The invention claimed is:

1. A method for producing a single-sided mold, comprising:
S1. forming a mold cavity on the single-sided mold according to shape of a product;
S2. engraving a surface of the mold cavity by a first engraving and milling cutter mounted on an engraving and milling machine, wherein under control of the engraving and milling machine, the first engraving and milling cutter revolves on its own axis and then exerts a vertical force onto the surface of the mold cavity, and then exits out of an engraved hole after the engraved hole is formed; and
inserting a second engraving and milling cutter mounted on the engraving and milling machine into the engraved hole for further engraving, wherein under control of the engraving and milling machine, the second engraving and milling cutter revolves on its own axis and then exerts a vertical force in the engraved hole, and then exits out of a hole to be coined after the hole to be coined is formed; and
wherein the first engraving and milling cutter is shaped as a pointed cutter with flat bottom or a straight cutter, and the second engraving and milling cutter is shaped as a pointed cutter with flat bottom with a smaller width and angle of knife tip than that of the first engraving and milling cutter; and depth of the engraved hole is smaller than that of the hole to be coined;

S3. repeating the step S2 until a predefined number of the holes to be coined are formed on the surface of the mold cavity;
S4. placing a coining die with hardened tips on the surface of the mold cavity, and embedding each of the hardened tips into one of the holes to be coined respectively, and then pressing the mold cavity by a hydraulic press, causing each of the holes to be coined being pressed to form the coining hole, and then taking out the coining die after a coining process is finished;
wherein a side wall of the hole to be coined matches shape of the hardened tip, and radius of a cusp on the end of the coining hole formed by the coining process is less than 0.02 mm.

2. The method for producing a single-sided mold according to claim 1, wherein in the step S2, the second engraving and milling cutter inclines to one side after exerting a vertical force in the engraved hole for a predefined time, and then revolves using an inserting path of the second engraving and milling cutter as a central axis until the side wall of the hole to be coined matches the shape of the hardened tip, and then the second engraving and milling cutter is controlled to return to a vertical state and exit out of the hole to be coined, and an inclination angle of the second engraving and milling cutter relative to a vertical direction is from 5° to 45°.

3. The method for producing a single-sided mold according to claim 2, wherein the radius of the cusp on the end of the hole to be coined ranges from 0.04 mm to 0.05 mm, and a depth of the hole to be coined is 0.05~0.2 mm less than the coining hole.

4. The method for producing a single-sided mold according to claim 3, wherein in the step S3, the first engraving and milling cutter moves to a next engraving position for engraving while the second engraving and milling cutter inserts into the engraved hole for further engraving.

5. The method for producing a single-sided mold according to claim 4, wherein the predefined number of holes to be coined formed in the step S3 is distributed in an array.

6. The method for producing a single-sided mold according to claim 5, wherein depth of the engraved hole is half of the depth of the hole to be coined.

7. The method for producing a single-sided mold according to claim 6, wherein a revolution of the first engraving and milling cutter ranges from 18000 r/min to 24000 r/min, and a revolution of the second engraving and milling cutter ranges from 24000 r/min to 30000 r/min, and amount of feeds of both the first engraving and milling cutter and the second engraving and milling cutter range from 1.3 m/min to 1.7 m/min.

8. The method for producing a single-sided mold according to claim 7, wherein pressure of the hydraulic press is 80 MPa.

* * * * *